(12) United States Patent
Noder et al.

(10) Patent No.: US 8,978,732 B2
(45) Date of Patent: Mar. 17, 2015

(54) SONOTRODE HOLDER

(71) Applicant: MS Spaichingen GmbH, Spaichingen (DE)

(72) Inventors: Elmar Noder, Bösingen (DE); Frank Eder, Spaichingen (DE)

(73) Assignee: MS Spaichingen GmbH, Spaichingen (DE)

( * ) Notice: Subject to any disclaimer, the term of this patent is extended or adjusted under 35 U.S.C. 154(b) by 0 days.

(21) Appl. No.: 14/029,095

(22) Filed: Sep. 17, 2013

(65) Prior Publication Data

US 2014/0083622 A1    Mar. 27, 2014

(30) Foreign Application Priority Data

Sep. 17, 2012   (DE) .................... 10 2012 216 584

(51) Int. Cl.
    *B32B 37/00*  (2006.01)
    *B29C 65/08*  (2006.01)
    *B06B 3/02*   (2006.01)

(52) U.S. Cl.
    CPC .. *B29C 65/08* (2013.01); *B06B 3/02* (2013.01)
    USPC ..................................... 156/580.2; 156/580.1

(58) Field of Classification Search
    USPC ............... 156/73.1, 580.1, 580.2; 425/174.2; 264/442, 443, 444, 445; 228/110.1, 228/1.1; 310/323.01, 323.18
    See application file for complete search history.

(56) References Cited

U.S. PATENT DOCUMENTS

| | | | | |
|---|---|---|---|---|
| 5,922,170 | A * | 7/1999 | Gerdes et al. ............... | 156/580.2 |
| 6,482,291 | B1 * | 11/2002 | Kume et al. ................ | 156/580.2 |
| 6,605,178 | B1 * | 8/2003 | Shinohara et al. ......... | 156/379.6 |
| 7,802,604 | B2 * | 9/2010 | Martin et al. .............. | 156/580.2 |

FOREIGN PATENT DOCUMENTS

| | | |
|---|---|---|
| DE | 1 179 405 | 10/1964 |
| DE | 2 343 605 | 4/1974 |
| DE | 20 2004 003 917 | 5/2004 |
| JP | 2006-212619 | 8/2006 |

OTHER PUBLICATIONS

German Search Report for German Application 10 2012 216 584.3 (May 14, 2013).

* cited by examiner

*Primary Examiner* — James Sells
(74) *Attorney, Agent, or Firm* — Mintz Levin Cohn Ferris Glovsky and Popeo, P.C.; Peter F. Corless; Steven M. Jensen

(57) ABSTRACT

A sonotrode holder for the oscillatable fastening of a sonotrode at a carrier is provided, wherein a direction of oscillation extends from the carrier to the sonotrode and the sonotrode holder has at least one oscillating body having at least one cut-out and the oscillating body is connected to the sonotrode at one end and has a mount which is configured for fastening at the carrier.

13 Claims, 2 Drawing Sheets

SONOTRODE HOLDER

CROSS-REFERENCES TO RELATED APPLICATIONS

Figure 1:
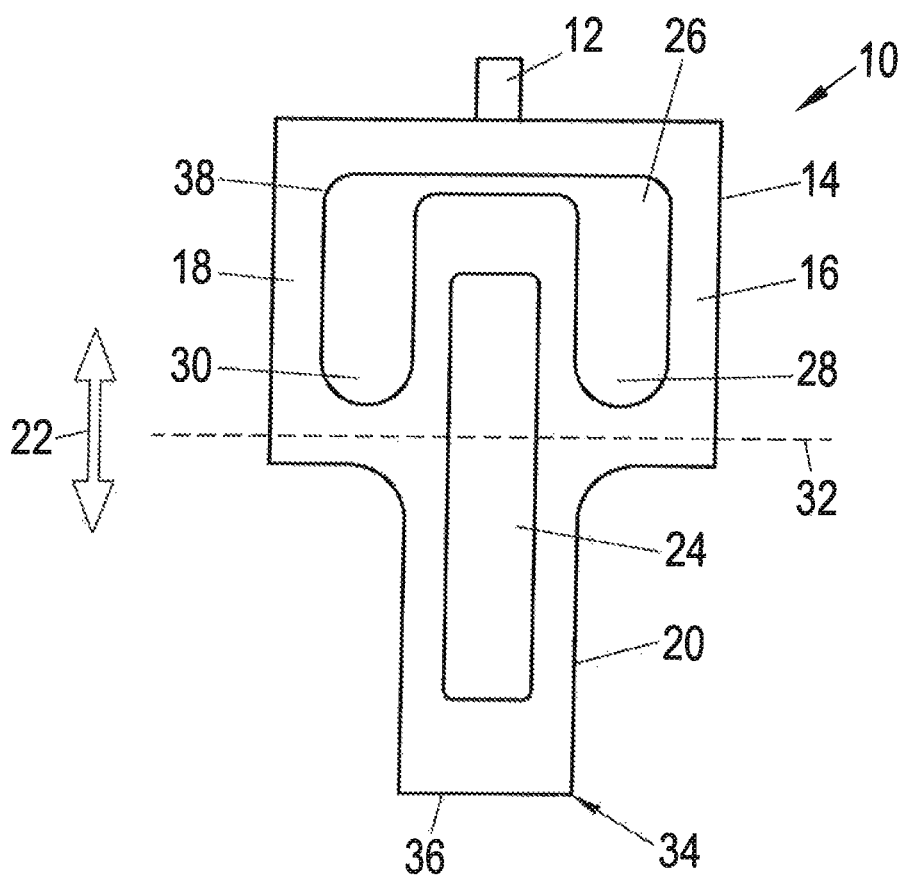

This application claims under 35 U.S.C. §119 the benefit of German Application No. 10 2012 216 584.3, filed Sep. 17, 2012, the entire contents of which is incorporated herein by reference in its entirety.

The present invention relates to a sonotrode holder for the oscillatable fastening of a sonotrode at a carrier, wherein a direction of oscillation extends from the carrier to the sonotrode.

Such sonotrode holders are known, for example, from apparatus for ultrasound welding, wherein the sonotrode is excited by means of an ultrasound converter and is set into mechanical oscillations. The oscillating sonotrode can be placed onto a material to be processed and transmits its mechanical oscillations to the material to be processed. The material to be processed can, for example, be heated by this energy input, whereby the sonotrode can be used for welding or sealing welding of different materials, in particular of plastics, films, fleeces, fabrics/textiles and/or paper.

A requirement for the welding of the material to be processed is a small minimum portion of a thermoplastic which is heated by the oscillations of the sonotrode and starts to melt. The plastic can enter into a connection with further materials in the melted state.

A very high pressure on the material to be processed can be required for welding work using a sonotrode or a sonotrode assembly. Very strong forces which can in particular lie in the range of several kilonewtons can thus act on the sonotrode or on the sonotrode assembly. For this reason, the sonotrode or the sonotrodes have to be fastened by means of a mechanically stable sonotrode holder so that the mechanical forces introduced into the sonotrode cannot result in a "dipping down" of individual sonotrodes, which can lead to damage. In addition, sonotrode holders have to be made with as long a life as possible, i.e. must have low wear.

The sonotrode holder ensures an exact guidance and positioning of the sonotrode during welding. Various sonotrode holders are already known for this purpose; for example, DE 20 2004 003 917 U1 discloses a sonotrode holder which comprises at least four auxiliary boosters which can be inserted into a sonotrode so that they can oscillate and counteract a tilting or pivoting of the sonotrode, wherein the sonotrode holder has to be adapted to the respectively used sonotrode, i.e. the geometry of the sonotrode holder has to be adapted to the sonotrode used.

It is an underlying object of the invention to provide a universal sonotrode holder which can be used with sonotrodes of various constructions and which also has as little wear as possible.

This object is satisfied by a sonotrode holder having the features of claim 1 and in particular in that the sonotrode holder has at least one oscillating body having at least one cut-out, wherein the oscillating body is connected to the sonotrode at one end and has a mount which is configured for fastening at the carrier.

The sonotrode is thus not directly connected to the mount, but is rather coupled to an oscillating body which can oscillate with adapted impedance at the frequency of the sonotrode and can in this manner relieve the mount of oscillations or can keep it almost fully free thereof. The cut-out of the oscillating body can in this respect serve to adapt the resonant frequency of the oscillating body to the frequency of the sonotrode.

In accordance with the invention, the oscillations of the sonotrode are therefore passed on to the oscillating body of the sonotrode holder, but substantially not to the mount. The mount fastened at the carrier is thus largely free of oscillations, whereby the demands on a fastening of the mount at the carrier can be reduced. The carrier is in particular also substantially kept free of oscillations by the sonotrode holder in accordance with the invention.

In addition, wear of the sonotrode holder can be limited to a minimum or completely avoided since the oscillating body can oscillate in resonance with the sonotrode. Unwanted forces due to non-adapted oscillation frequencies between the oscillating body and the mount and/or the carrier can thus be avoided.

Advantageous embodiments of the invention are described in the description, in the drawings and in the dependent claims.

In accordance with a first advantageous embodiment, the oscillating body is made in parallelepiped form. The mount can in this respect be connected particularly simply to the oscillating body due to the parallelepiped form.

In accordance with a further advantageous embodiment, the cut-out is an elongate hole extending in the direction of oscillation. An elongate hole can be manufactured without any great effort from a technical production aspect and its length can be adapted to the respective use.

In accordance with a further advantageous embodiment, the mount can be configured substantially in U shape and the two limbs of the U-shaped mount can be connected to the oscillating body approximately at the center thereof viewed in the oscillating direction.

The substantially U-shaped mount can engage around the, for example, parallelepiped-shaped oscillating body from the outside. In this respect, the limbs of the mount can be connected to the oscillating body approximately at the center thereof. Approximately half of the oscillating body can thus be received in the U shape of the mount. A second half of the oscillating body can project out of the U-shaped mount.

Due to the resonant oscillation of the oscillating body, the oscillating body comprises zones having larger and smaller amplitudes of ultrasonic oscillation. A so-called zero line, that is a zone of smallest amplitude (oscillation nodes) advantageously extends approximately at the center of the oscillating body viewed in the direction of oscillation.

The connection to the mount is thus only loaded by small expansions due to the amplitude. In addition, in this manner, no oscillations or only a small oscillation portion, are transmitted to the mount, whereby wear of the sonotrode holder is reduced to a minimum.

In accordance with a further advantageous embodiment, the cut-out or the elongate hole can be arranged approximately centrally between the two ends of the limbs of the U-shaped mount in the oscillating body. In this manner, a symmetrical structure of the oscillating body can take place, whereby a symmetrical oscillation distribution can likewise be adopted in the oscillating body. The load of the U-shaped mount can thus be distributed evenly over both sides, which can likewise result in a wear reduction since forces which arise can be evenly distributed.

In accordance with a further advantageous embodiment, the mount and the oscillating body can be made in one piece. This in particular results in a mechanically especially stable sonotrode holder which can absorb strong static and dynamic forces. The sonotrode holder in accordance with the invention can in particular absorb strong unilateral loads of several kilonewtons, with it only yielding by a few micrometers under such loads.

Furthermore, the oscillating body can comprise rounded corners, which in particular facilitates a one-piece manufacture of the sonotrode holder from one material block.

In accordance with a further advantageous embodiment, the mount can comprise a respective one cut-out in a region of the two ends which cut-outs can in particular serve to set the resonant frequency of the oscillating body.

In accordance with a further advantageous embodiment, a substantially U-shaped hollow space can be arranged between the oscillating body and the mount, with the hollow space including the cut-out of the mount. Alternatively, the hollow space can also be made in V shape. The oscillating body can thus oscillate without hindrance without impacting the mount while oscillating. The hollow space can thus allow an unimpeded oscillation of the oscillating body. Furthermore, the hollow space can merge into the cut-outs, whereby the hollow space includes the cut-outs of the mount.

In accordance with a further advantageous embodiment, the oscillating body can have substantially the same length as the sonotrode viewed in the direction of oscillation. In this manner, a simple impedance adaptation of the oscillating body to the sonotrode is ensured. It can thus be ensured that the oscillating body oscillates in resonance when the sonotrode is in resonance since in particular the length of the oscillating body in the direction of oscillation is responsible for the resonant frequency of the oscillating body.

Consequently, only the size of the sonotrode holder has to be varied or scaled to be adapted to any desired resonant frequencies of any desired sonotrodes. The basic design of the sonotrode holder can remain the same independently of the sonotrode used. The sonotrode holder in accordance with the invention thus covers a very wide spectrum of use.

In accordance with a further advantageous embodiment, the mount can have at least one spigot at an end facing the carrier and can be wedgeable with the carrier by means of the spigot. A connection can be realized by the wedging of the sonotrode holder with the carrier which is simple to establish, but is nevertheless resilient.

In accordance with a further advantageous embodiment, the oscillating body can be connected to the mount in the region of an oscillation node. The oscillation amplitude of the oscillating body is minimal in the region of an oscillation node, whereby only a minimal force caused by the oscillation is passed onto the mount. The mount can in this respect be kept largely free of oscillations, whereby the carrier is likewise only loaded by very small oscillation amplitudes. In this manner, a very high oscillation reduction can be achieved between the sonotrode and the carrier by means of the sonotrode holder in accordance with the invention.

It must be noted that the oscillation node in this respect does not necessarily have to lie centrally in the oscillating body viewed in the direction of oscillation, but can rather also be arranged at a quarter of the length of the oscillating body, for example, with higher order resonances.

With higher order resonances which are associated with a plurality of oscillation nodes in the oscillating body, mounts can thus also be provided which can be connected to the oscillating body at one, two, three, four, six or eight points. In principle, in this respect, any number of connections between the oscillating body and the mount is conceivable, wherein at least one connection is required for each oscillation node. Alternatively, two connections can also be provided for each oscillation node.

In accordance with a further advantageous embodiment, the oscillating body can substantially have the same resonant frequency as the sonotrode. In resonant operation of the sonotrode, the sonotrode holder can thus be operated without any wear or with only low wear since the oscillating body in resonance only passes on minimal oscillating amplitudes to the mount.

The invention further relates to a sonotrode holder system comprising at least two sonotrode holders which are arranged in parallel with one another such that their elongate holes extend in parallel. The sonotrode holders can in this respect selectively be arranged with or without an interposed spacing so that an effective depth of the sonotrode holder system can be varied. Larger sonotrodes can thus also be fastened by means of the sonotrode holder system in accordance with the invention than would be possible with a single sonotrode holder.

With the sonotrode holder system in accordance with the invention, in particular all the oscillating bodies of the used sonotrode holders can oscillate in resonance with the sonotrode and thus allow an almost wear-free operation of all sonotrode holders of a sonotrode holder system.

A sonotrode arrangement is likewise a component of the invention which comprises at least one sonotrode, a sonotrode holder system, an ultrasound converter as well as a carrier with which the sonotrode holder system is wedged. Such a sonotrode arrangement can, for example, be used for the above-mentioned ultrasound welding.

The invention will be described in the following purely by way of example with reference to possible embodiments and to the enclosed drawings. There are shown in a schematic representation:

FIG. 1 a sonotrode holder in accordance with the invention in a side view; and

Figure 2:
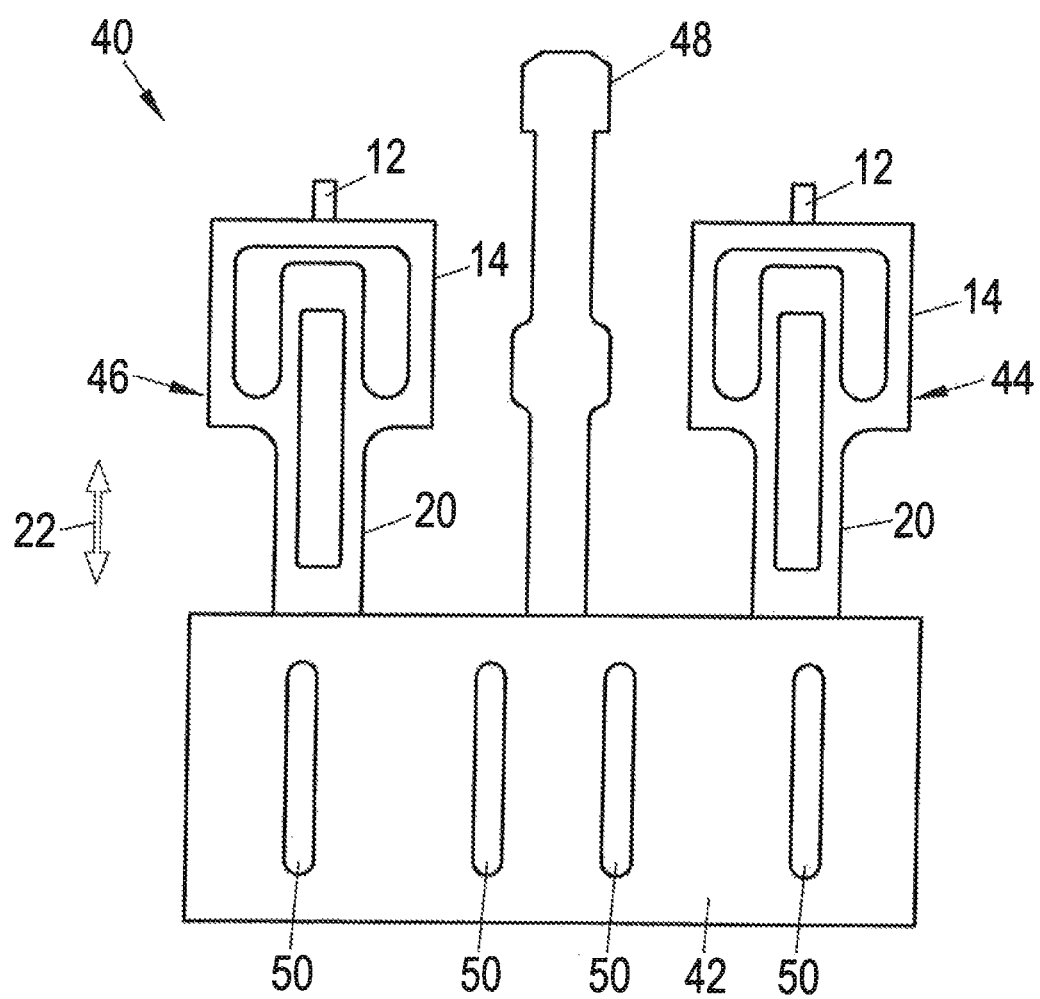

FIG. 2 a sonotrode arrangement in accordance with the invention in a side view.

A sonotrode holder 10 in accordance with the invention is shown in FIG. 1 in a side view which comprises at its upper end a spigot 12 which can be wedged with a carrier (not shown). The spigot 12 is connected to a mount 14, e.g. molded to it, and said mount has a substantially U-shaped contour. Approximately half of a parallelepiped-shaped oscillating body 20 extends between two limbs 16, 18 of the mount 14 and is centrally connected to the limbs 16, 18 of the mount 14 viewed in a direction of oscillation 22.

An elongate hole 24 extending in the direction of oscillation 22 is arranged centrally between the limbs 16, 18. The oscillating body 20 and the mount 14 are in this respect made in one piece.

A hollow space or a U-shaped recess 26 which opens into cut-outs 28, 30 is formed between the oscillating body 20 and the mount 14. Both the recess 26 and the oscillating body 20 have rounded corners. The cut-outs 28, 30 are arranged such that a transition from the oscillating body 20 to the limbs 16, 18 of the mount 14 is substantially symmetrical with respect to a zero lone 32 of the oscillating body 20. Alternatively, the cut-outs 28, 30 can have a substantially droplet-like contour, whereby a transition between the two ends of the mount 14 and the oscillating body 20 can be made substantially symmetrical with respect to their curve radii. A droplet-like design of the cut-outs 26, 28 is in particular possible when the mount 14 is arranged close to the oscillating body 20. A symmetrical design in this respect prevents an overload of individual points or of one side. Furthermore a transition between the oscillating body 20 and the limbs 16 which allows the absorbing of high forces can in particular be provided between the oscillating body 20 and the limbs 16, 18.

A sonotrode fastening 36 to which a sonotrode 42 (cf. FIG. 2) can be fastened is arranged in the region of a lower end 34 of the oscillating body 20.

In operation of the sonotrode holder 10 in accordance with the invention, an oscillating sonotrode 42 is fastened to the oscillating body 20 by means of the sonotrode fastening 36. The sonotrode 42 in this respect oscillates in the direction of oscillation 22 and transmits these oscillations to the oscillating body 20. When the oscillating body 20 is excited in resonance, the amplitude of the oscillation is maximum at the lower end 34 as well as at an upper end 38 of the oscillating body 20. The amplitude and thus the deflection of the material of the oscillating body 20 is in contrast minimal in the region of the zero line 32. An oscillation node is present in the region of the zero lone 32 in resonant operation.

An oscillation of the oscillating body 20 is also possible between the limbs 16, 18 due to the recess 26.

The limbs 16, 18 are only excited slightly to make oscillations by the oscillating body 20 since the limbs 16, 18 are connected to the oscillating body 20 in the region of the zero line 32. The deflection of the limbs 16, 18 or of the total mount 14 by the oscillation of the oscillating body 20 is thus minimal. Only minimal oscillation amplitudes are thus passed on to the carrier via the spigot 12.

FIG. 2 shows a schematic side view of a sonotrode arrangement 40 in accordance with the invention which comprises a sonotrode 42 and two sonotrode holder systems 44 having two sonotrode holders 10 each which are arranged aligned. The sonotrode arrangement 40 furthermore comprises an ultrasound converter 48 as well as a carrier (not shown) which fastens the sonotrode holder systems 44, 46 and the ultrasound converter 48.

Both the sonotrode holder systems 44, 46 and the ultrasound converter 48 engage in a plane at the sonotrode 42 at an upper end of the sonotrode 42. The sonotrode 42 comprises elongate holes 50 and preferably has approximately the same length as the oscillating bodies 20 viewed in the direction of oscillation 22.

Optionally, the sonotrode 42 and the sonotrode holder 10 can be made with the same lengths viewed in the direction of oscillation 22. The sonotrode holder 10 can thus substantially have the same resonant frequency as the sonotrode 42.

The sonotrode holder systems 44, 46 are wedged with the carrier, not shown, by means of spigots 12.

In operation, the ultrasound converter 48 generates a mechanical oscillation with the resonant frequency of the sonotrode 42. This oscillation is introduced into the sonotrode 42, whereby the sonotrode 42 starts to oscillate in resonance. The oscillations of the sonotrode 42 are in turn passed on to the oscillating bodies 20 of the sonotrode holder systems 44, 46. Due to the fastening of the oscillating bodies 20 to an oscillation node, the oscillation of the resonantly oscillating oscillating bodies 20 are passed on greatly damped to the mounts 14 of the sonotrode holder systems 44, 46 and thus substantially not to the carrier. The loads by the sonotrode 42 are in this respect distributed over the individual sonotrode holders 10 of the sonotrode holder systems 44, 46.

The sonotrode arrangement 40 in accordance with the invention thus allows an operation of the sonotrode 42 at very high mechanical loads, with an exact guidance of the sonotrode 42 being ensured by the sonotrode holders 10 in accordance with the invention or by the sonotrode holder systems 44, 46 in accordance with the invention despite the load.

REFERENCE NUMERAL LIST 10 sonotrode holder
12 spigot
14 mount
16 limb
18 limb
20 oscillating body
22 direction of oscillation
24 elongate hole
26 recess
28 cut-out
30 cut-out
32 zero line
34 lower end
36 sonotrode fastening
38 upper end
40 sonotrode arrangement
42 sonotrode
44 sonotrode holder system
46 sonotrode holder system
48 ultrasound converter
50 elongate hole

The invention claimed is:

1. A sonotrode holder for an oscillatable fastening of a sonotrode at a carrier, wherein a direction of oscillation extends from the carrier to the sonotrode, the sonotrode holder comprising:
at least one oscillating body having at least one cut-out, with the oscillating body being connected at one end to the sonotrode and having a mount which is configured for fastening to the carrier, the oscillating body having an inner surface and an outer surface,
wherein the inner surface confines the cut-out, and the mount is connected to the oscillating body at the outer surface in a region of an oscillating node.

2. The sonotrode holder in accordance with claim 1, wherein the oscillating body is configured as parallelepiped-shaped.

3. The sonotrode holder in accordance with claim 1, wherein the cut-out is an elongate hole extending in the direction of oscillation.

4. The sonotrode holder in accordance with claim 1, wherein the mount is substantially configured in U shape and the two limbs of the U-shaped mount are connected to the oscillating body approximately at the center thereof viewed in the direction of oscillation.

5. The sonotrode holder in accordance with claim 1, wherein the cut-out is arranged approximately centrally between the two ends of the limbs of the U-shaped mount in the oscillating body.

6. The sonotrode holder in accordance with claim 1, wherein the mount and the oscillating body are formed in one piece.

7. The sonotrode holder in accordance with claim 1, wherein the mount comprises a respective cut-out in a region of two ends of the mount.

8. The sonotrode holder in accordance with claim 7, further comprising a substantially U-shaped hollow space which is arranged between the oscillating body and the mount, with the hollow space including the cut-outs of the mount.

9. The sonotrode holder in accordance with claim 1, wherein the oscillating body has substantially the same length as the sonotrode viewed in the direction of oscillation.

10. The sonotrode holder in accordance with claim 1, wherein the mount has at least one spigot at an end facing the carrier and can be wedged with the carrier by means of the spigot.

11. The sonotrode holder in accordance with claim 1, wherein the oscillating body has substantially the same resonant frequency as the sonotrode.

12. A sonotrode holder system, comprising:
at least two sonotrode holders for an oscillatable fastening of a sonotrode at a carrier,
wherein a direction of oscillation extends from the carrier to the sonotrode,
the sonotrode holder comprising at least one oscillating body having at least one cut-out, the oscillating body having an inner surface and an outer surface, with the oscillating body being connected at one end to the sonotrode and having a mount which is configured for fastening to the carrier, the sonotrode holders being arranged in parallel with one another such that their elongate holes extend in parallel, and
wherein the inner surface confines the cut-out, and the mount is connected to the oscillating body at the outer surface in a region of an oscillating node.

13. A sonotrode arrangement which comprises at least one sonotrode in a sonotrode holder system, comprising:
at least two holders for an oscillatable fastening of the at least one sonotrode at a carrier,
wherein a direction of oscillation extends from the carrier to the sonotrode,
the sonotrode holder comprising at least one oscillating body having at least one cut-out, the oscillating body having an inner surface and an outer surface, with the oscillating body being connected at one end to the sonotrode and having a mount which is configured for fastening to the carrier, the sonotrode holders being arranged in parallel with one another such that their elongate holes extend in parallel, and
an ultrasound converter,
wherein the sonotrode holder system is wedged by the carrier, and
the inner surface confines the cut-out, and the mount is connected to the oscillating body at the outer surface in a region of an oscillating node.

* * * * *